April 3, 1934.　　　H. J. L. FRANK　　　1,953,343
SWITCH BLOCK
Original Filed April 8, 1929　　9 Sheets-Sheet 1

April 3, 1934.  H. J. L. FRANK  1,953,343
SWITCH BLOCK
Original Filed April 8, 1929  9 Sheets-Sheet 2

INVENTOR.
Harrison J. L. Frank
BY Francis D. Hardesty
ATTORNEY.

April 3, 1934. H. J. L. FRANK 1,953,343
SWITCH BLOCK
Original Filed April 8, 1929 9 Sheets-Sheet 3

INVENTOR.
Harrison J. L. Frank
BY Francis D. Hardesty
ATTORNEY.

April 3, 1934.    H. J. L. FRANK    1,953,343
SWITCH BLOCK
Original Filed April 8, 1929    9 Sheets-Sheet 4

INVENTOR.
Harrison J. L. Frank
BY Francis D. Hardesty
ATTORNEY.

April 3, 1934.  H. J. L. FRANK  1,953,343
SWITCH BLOCK
Original Filed April 8, 1929  9 Sheets-Sheet 6

INVENTOR.
Harrison J. L. Frank
BY Francis D. Hardesty
ATTORNEY.

April 3, 1934.  H. J. L. FRANK  1,953,343
SWITCH BLOCK
Original Filed April 8, 1929   9 Sheets-Sheet 7

INVENTOR.
Harrison J. L. Frank
BY Francis D. Hardesty
ATTORNEY.

April 3, 1934.     H. J. L. FRANK     1,953,343

SWITCH BLOCK

Original Filed April 8, 1929     9 Sheets-Sheet 8

INVENTOR.
Harrison J. L. Frank
BY Francis D. Hardesty
ATTORNEY.

Patented Apr. 3, 1934

1,953,343

UNITED STATES PATENT OFFICE 1,953,343

SWITCH BLOCK

Harrison J. L. Frank, Highland Park, Mich., assignor to Bull Dog Electric Products Company, Detroit, Mich., a corporation of West Virginia Original application April 8, 1929, Serial No. 353,343. Divided and this application March 31, 1930, Serial No. 440,189

21 Claims. (Cl. 200—133)

This invention relates to switch blocks and more particularly to switch blocks which are mounted on or adjacent bus bars to form panel boards.

It has been the practice in the electrical industry to form panel boards by providing on a mounting plate, bus bars and panel board elements such as switch blocks, fuse clips, etc., these elements being more or less permanently fastened to the insulating mounting plate and forming a non-alterable panel board.

In the application of Harrison J. L. Frank, Serial No. 353,343 filed April 8, 1929, of which this case is a division, there is disclosed a panel board including switch blocks of uniform width, each being of a length equal to non-fractional multiples of a predetermined unit, said blocks being combined and interchangeably mounted upon a mounting plate to form a complete panel board. This application relates solely to the switch block, to novel details of construction thereof, and novel means for mounting a switch block upon a plate and for connecting a block and electrically conducting parts thereof to the bus bars provided upon the plate.

It is, therefore, an object of this invention to provide a block comprising a female member detachably mounted adjacent bus bars, and a male member detachably mounted upon and connectible to the female member, all of said male members being interchangeable, within certain limits, upon various female members, whereby a sectional panel board may be built up and interchanged with other panel boards with great facility, and whereby quantity production methods may be used in the manufacture of various parts comprising a complete panel board.

An object of this invention also, is to provide a switch block which is mountable from the front of the panel board and which can be electrically connected to the bus bars upon the board from the front thereof, eliminating any necessity for dismounting the panel board itself when alterations in circuit arrangements are desired.

A further object is to provide switch blocks all of which are of the same width and each of which is of a length equivalent to non-fractional multiples of a predetermined unit, said blocks being provided with uniform constructional and mounting details whereby said blocks may be readily interchanged upon the same or different panel boards without disturbing the ordered appearance of the latter.

A further object is to provide a switch block which is mountable upon a panel board and connectible electrically to bus bars thereon, the mounting means being, if desired, independent of the electrically connecting means whereby alterations in electrical circuit arrangements may be made without disturbing the mounting of a block upon the board.

A still further object is to provide switch blocks having mounting means accessible from the front of the board, thus eliminating all necessity of removing the board from the supporting wall when removal of or alterations in the blocks is desired.

A further object is to provide a block having apertures in which electrically connecting means are provided, said apertures being initially provided with so-called "knock-out" portions forming a complete insulating barrier between the interior of the block and the bus bars behind the latter, except when the "knock-out" portions are removed and electrically connecting parts are inserted in the apertures.

A still further object is to provide a novel means for connecting a block to bus bars, said means comprising a screw floating therein and removable therefrom, but releasably secured thereto, so that it cannot be separated from the block under ordinary working conditions, but which will still permit proper electrical contact, when desired.

Another object is to provide a mounting means including a bolt or screw and a partially threaded washer, one which will hold the screw to the block and which will afford a great contact area between the screw and a contact on the block, the washer itself being loosely held to the block by the screw so that when the block is mounted on a bus bar, it cannot be lost and drop into short circuiting proximity to a bus bar.

A further object is to provide a block having spaced electrically connecting means, the spacing corresponding to the spacing of the bus bars over which the block is to be mounted, any one or more of the electrically connecting means being used to connect any one or more of the bus bars to the parts within the block whereby phase selection is made feasible without dismounting the block from the panel.

It has been also the practice, in the electrical industry to provide an interlock between the fuses upon the panel board and the switches thereon so that replacement or removal of fuses is not permitted until the fused circuit has been opened on at least the live side of the fuse, for safety reasons.

It has further become the practice, as illustrated in the patent to Harrison J. L. Frank, No. 1,733,370, October 29, 1929, to provide a combined switch and fuse block unit comprising a female member having spaced circuit contacts and a male member having spaced circuit contacts adapted to cooperate with the contacts in the female member, the male member also carrying a fuse between the contacts thereon, removal of the male member from the female member causing opening of the circuit and permitting access to the fuse therein.

It is an object of this invention, therefore, to provide a switch block of the character described in the above mentioned patent wherein the block is provided with means to prevent the insertion of an improper fuse in a circuit, said means being removable and interchangeable.

A further object is to provide a receptacle adapted to receive a single large fuse plug and a receptacle adapted to contain a double small fuse plug, said receptacles being interchangeable, the construction details being such that a great saving in space and material being effected without minimizing opposite polarity clearances to a degree considered unsafe by electrical experts.

It is a further object to provide a male member of the above designated character which is adapted to receive cartridge fuses or fuses of the so-called open link type.

It is a further object to provide a novel means for mounting and securing a fuse in a plug member, the latter having switch contacts as well as fuse holding means.

A further object is to provide a switch block having means for shielding the contacts therein and having means for guiding a plug member into engagement therewith, so as to permit rapid switching movement of the parts, said guiding means being so constructed as to cause the male member to completely close the openings in the female member before contact is made between the electrically conducting parts therein, thus preventing exposure of arcs formed upon contact.

A further object is to provide a switch block wherein the electrically conducting parts are provided in depressions in the walls, the portions between said depressions constituting barriers for preventing short circuits between parts of opposite polarity.

A further object is to provide a device of the above mentioned character which is made more compact than similar devices by certain constructional improvements, one of which includes the step of providing cable terminal lugs between contact jaws, rather than on the outside thereof.

A further object is to provide a novel contact, one that includes a pair of bowed portions which form a space for the reception of a cable terminal lug, thus permitting economy in space and overall width of the block.

A further object is to provide a cooperating plug and receptacle for panel boards, the parts being so formed that the plug, which has contact on one side only, completes a circuit between contacts in the receptacle, the plug being insertable in the receptacle in a reverse or contact exposing position to form a means for opening the circuit and for indicating the condition of the latter, there being provided means for retaining the parts in cooperation during the open circuit position.

A further object is to provide an insulating plug member with a metallic reinforcing plate therein, the latter also forming a handle for the plug.

A still further object is to provide a plug and receptacle having cooperating contacts and having formations which permit the plug to completely close the receptacle before contact is made on plug insertion, and to completely close the receptacle during and after the time contact is broken upon plug withdrawal.

A further object is to provide a plug and receptacle having spring friction means for securing the parts in engagement.

It has also become the practice among manufacturers to provide switch parts with means permitting testing of a circuit without interrupting the latter, and it is an object of this invention to follow such practice by providing a novel plug member having parts which permit testing of the circuit without interruption thereof.

A further object is to provide a fused switch plug with formations for permitting testing of the fuses therein without removing the latter or breaking the circuit in any way.

A further object is to provide a fused switch block with formations which permit the escape of gases caused by arcing, blowing out of fuses, and the like, said formations also providing testing access to the interior of the device.

A further object is to provide a switch block with removable insulating portions which completely shield electrically connecting parts therein and which can be moved to expose the latter whenever desired.

Still other objects will readily occur to those skilled in the art upon reference to the following description and accompanying drawings in which.

Referring first to Figs. 1 to 5 it will be seen that a device embodying the invention comprises a female member 20 provided with four legs 21 dividing its under portion into three channels for the accommodation of bus bars 22, 22a and 22b (Fig. 8) and at each end of said member there is an opening (23 and 24) extending from the corresponding channel into the cup portion. Each of these openings 23 and 24 has a connecting opening 25 leading out of the end of the member. The floor of the cup portion covers the central channel and part of the side channels and is provided with screw holes therein over each, for a purpose disclosed later. Also, within the cup is a low cross-rib or barrier 26 immediately over one of the intermediate legs 21.

Figure 1:
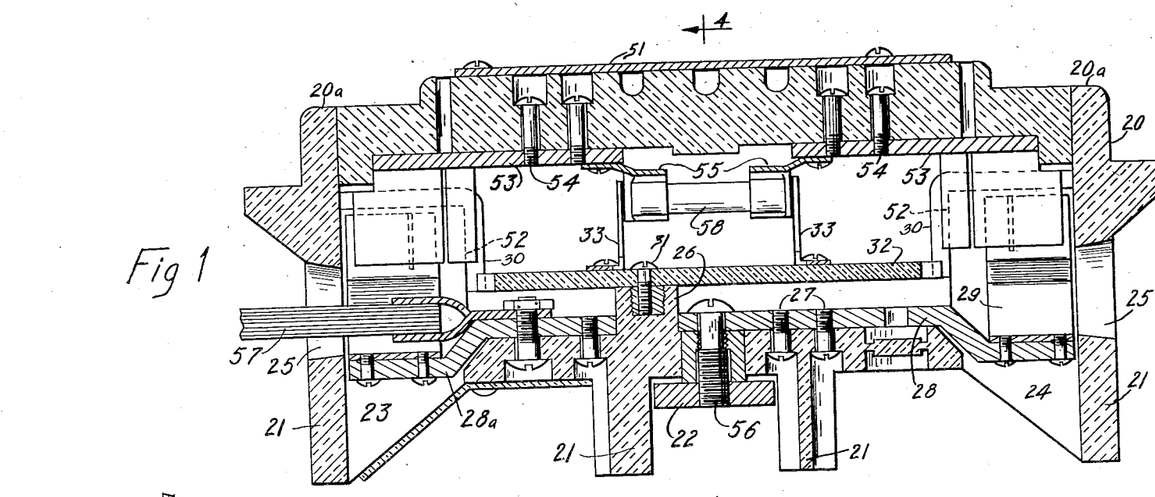
Fig. 1 is a bottom plan view in section of the device of the present invention.

Secured to the floor of the cup of female member 20 as by screws 27 and extending from barrier 26 to the end wall beyond opening 24 and preferably bent so as to lie below opening 25 is conducting plate or bar 28 carrying at its outer end a pair of spring fingers 29 which extend well up above the cup floor but whose upper ends are considerably below the top of the walls thereof and below the inwardly projecting shielding portions 30. At the other end of the cup floor is a second bar or plate 28a similar in every respect to plate 28 except that it is not so long as it overlies only one channel.

Figure 5:
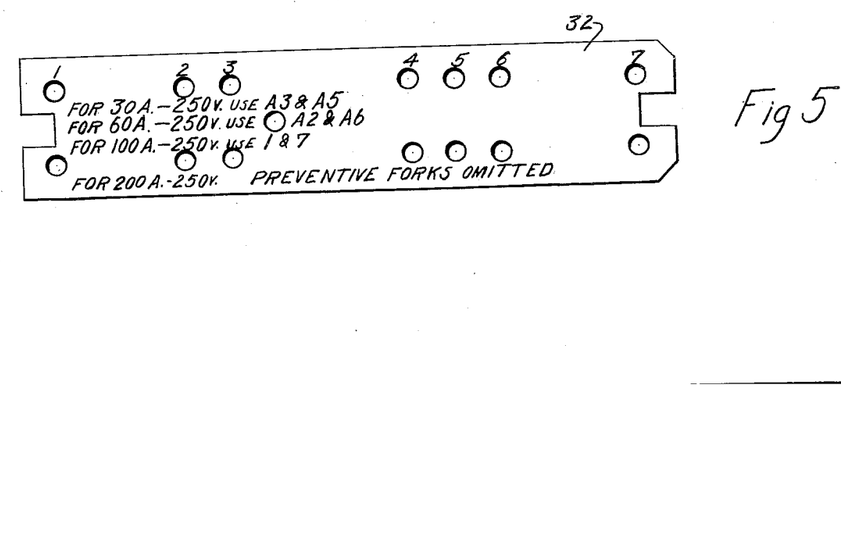
Fig. 5 is an elevation of the limiting plate of the present invention.

Also within the cup of member 20 and secured to barrier 26 as by screw 31 is a strip of insulating material 32, shown in plan in Fig. 5. This strip 32 may be designated the fuse "limiting strip" and is provided with a plurality of screw holes, carefully located, through which selecting or limiting member stops 33 may be attached thereto. These stops are shown in Fig. 1 as secured in holes numbered 3 and 5 in Fig. 5.

Figure 3:
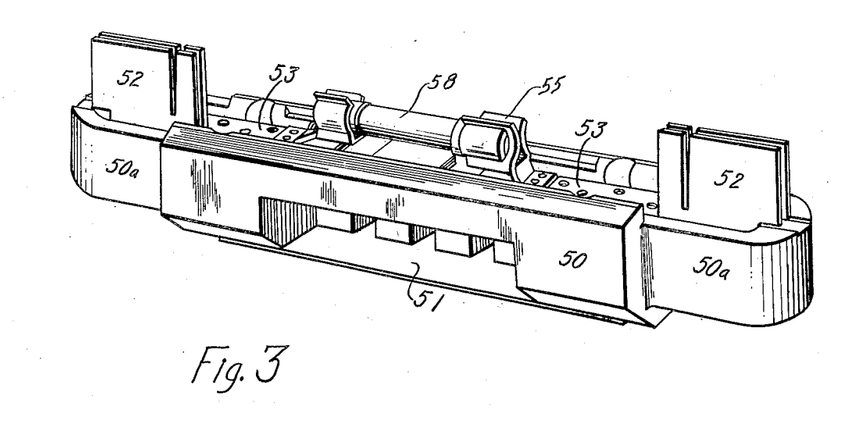
Fig. 3 is a perspective of the male member thereof.
Figure 4:
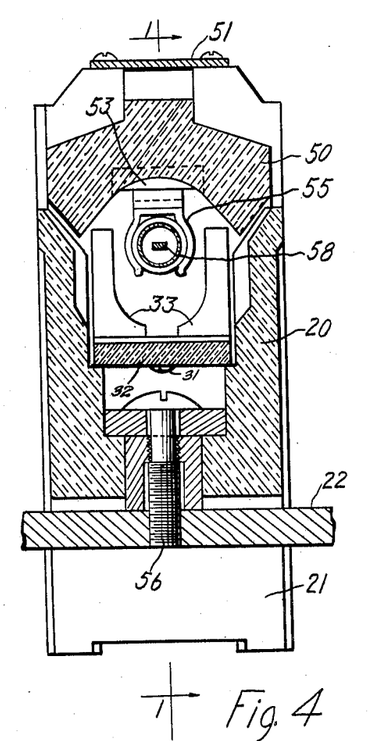
Fig. 4 is an end section on the line 4—4 of Fig. 1.

The male member 50 of the device consists of a block of insulating material shaped to fit within the upper portion of the female member and is provided with a suitable hand grip 51 on its outer face, which may consist of a metal plate too short to extend from one pair of fingers 29 to the other so that when the block 50 is inserted top down there can be no current flow and all live parts are hidden.

The underside of block 50 carries at each end spring fingers 52 attached to plates 53 secured to the block as by screws 54 passing through the block and having their heads well sunk below the upper surface out of contact with hand plate 51. Plates 53 extend from near the central portion of the block to close the ends thereof and have the fingers 52 at their outer ends where they are in position to mate with fingers 29 of the female member. To their inner ends are attached fuse clips 55 for the reception of one of the smaller fuses 58 for which the device is adapted.

With a bus bar connected to plate 28 by a screw 56 extending therethrough and through the floor of the cup of member 20 and into the bar as shown clearly in Fig. 1 and with a lead cable 57 secured to plate 28a as shown in the same figure, the connection through the fuse 58 from bar 22 to cable 57 is made by inserting the block or member 50 into the other member with fingers 52 embraced by fingers 29. It should be noted that the pairs of fingers are of such length that when the block is being inserted, the edges 50a are within or about to enter the upper edge 20a of member 20 when the fingers 52 first touch fingers 29. Such being the case, the conducting parts of both members are completely covered at all times before the circuit through the device is complete while the parts are piloted together by the non-conducting material to allow quick switching action.

Figure 2:
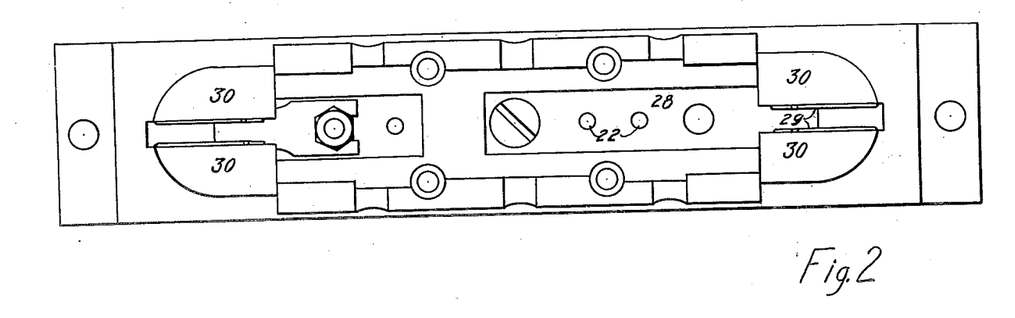
Fig. 2 is a front view of the female member thereof.

The device as shown in Figs. 1 to 3 is arranged for the reception of the smallest size fuse for which it is adapted. The next larger fuse is accommodated by securing fuse clips at a somewhat greater relative distance on bars 53 and moving the prongs 33 accordingly.

Figure 6:
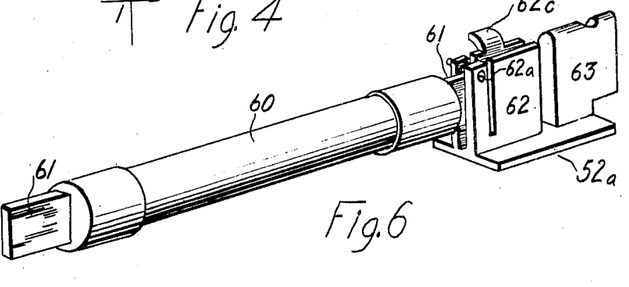
Fig. 6 is a perspective view of a fuse, a fuse clip and a contact, all of which are provided on the male member.

The next larger fuse, for example, a 100 amp. fuse is usually made with a blade extending longitudinally from each end. When these are to be used, plates 52 are removed from block 50 and the plates 52a, one of which is shown in Fig. 6, are substituted. The prongs 33 are then set at the ends of the limiting plate 32. Fig. 6 shows a fuse 60 with blades 61 at each end and how the fuse 60 is mounted in spring fingers 62 on plate 52a, a cotter pin or screw 62a being used if desired to secure the fuse in position. These fingers serve to hold the fuse while a contact member 63 on the end of the plate coacts with fingers 29 in member 20. It will be noted that if a larger fuse is attempted to be used with the parts set as mentioned the prongs 33 will prevent its being placed in position to conduct current.

Figure 7:
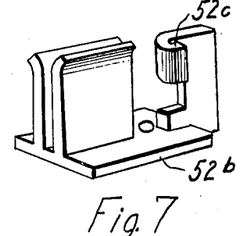
Fig. 7 is a perspective view of a fuse clip and a different form of contact member.

When the largest size fuse is to be used an end plate 52b (Figs. 7 and 18) is used and the prongs 33 are omitted.

Figs. 14 to 18 show diagrammatically the action of the prongs 33 and fuse clips in preventing the admission of improper fuses.

As shown in Fig. 5 the limiting plate 32 is provided with screw holes by means of which the prongs 33 may be placed in several different positions. As indicated also, bars 53 are provided with means by which fuse clips may be secured at different positions and in the case of the fuse clips, these may be not only placed at different distances apart but a pair may be shifted longitudinally of the member 50 but may not be displaced laterally from the center line.

Figs. 14 to 18 show examples of prearrangement of the fuse clips and prongs 33 preventing the insertion of improper fuses. Supposing, for instance that a number of the devices are grouped and that each is arranged for a different value of fuse, the members 50 being all alike except for the fuse thereon, would furnish no readily noted means for indicating to which member 20 it belonged. Therefore, if there were no means to prevent, a 60 ampere fuse might be substituted for a 30 ampere fuse with disastrous results.

Figures 14, 15, 16, 17, 18:
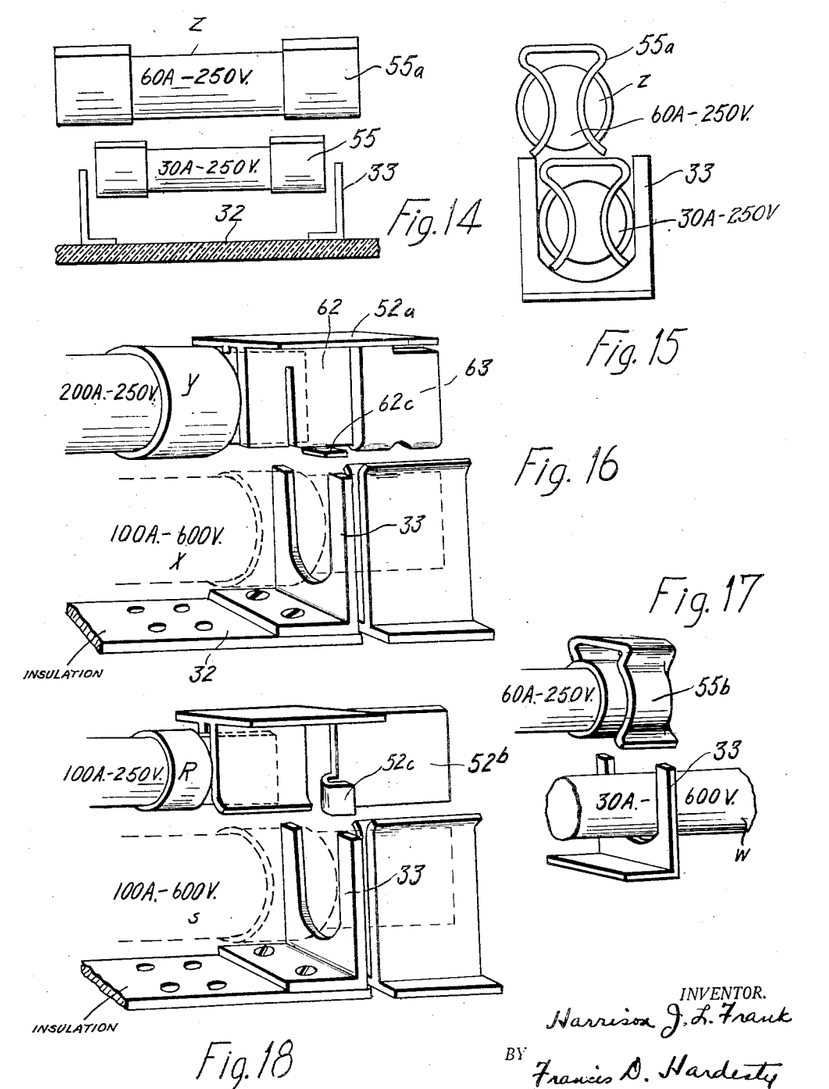
Figs. 14, 15, 16 and 17 and 18 are details of fuse limiting means.

Figs. 14 and 15 show how the prongs 33 will prevent the substitution mentioned. In this case the larger fuse Z will be held in clips located to one side of the center line of member 50 and cannot be inserted because one or both clips 55a will strike the upper end of a prong 33.

Fig. 16 show the parts arranged, for example, for the proper reception of a 100A—600V fuse X and shows how a member 50 carrying a 200A—250V fuse Y cannot be inserted because tongue 62c on finger 62 strikes a prong 33.

Fig. 17 shows the parts arranged, for example, for a 30A—600V fuse W and the preventing of the entry of a 60A—250V fuse because of the interference by prong 33 with fuse clip 55b.

Fig. 18 shows the parts arranged, for example, for a 100A—600V fuse S and the prevention of entry of a 100A—250V fuse R because tongue 52c strikes a prong 33.

From these examples it may be seen that the parts may be so arranged as to prevent the insertion of member 50 carrying a standard fuse of either higher amperage value or lower voltage value than that for which the parts are set. The insertion of fuses of lower amperage or higher voltage values is not liable to cause difficulty as these would merely burn out.

Figure 8:
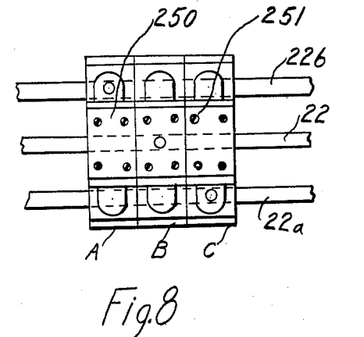
Fig. 8 is a front view of a plurality of bus bars and a plurality of switch blocks, the latter being ganged for multiple switching.

Fig. 8 shows the possibility of grouping the present devices over the common three bar arrangement. It shows, for example, device A as connected to bar 22b, device B to bar 22, and device C to bar 22a. In this case, one of the devices, either A or C will be reversed in position.

Testing head

In Figs. 9 to 13 is shown a modification of the device just described in which means is provided for the insertion into the circuit of a testing or measuring instrument.

Figure 9:
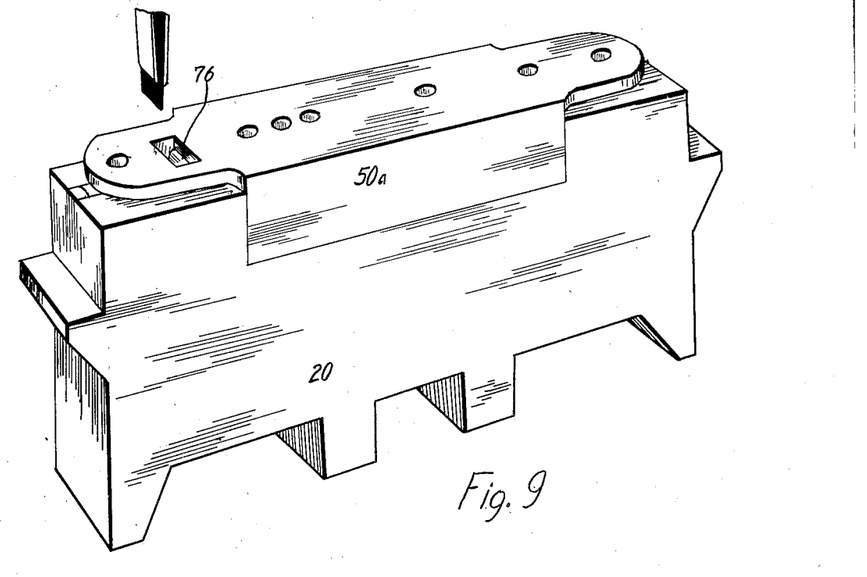
Fig. 9 is a bottom perspective view of the switch of the present invention equipped for circuit testing.
Figure 10:
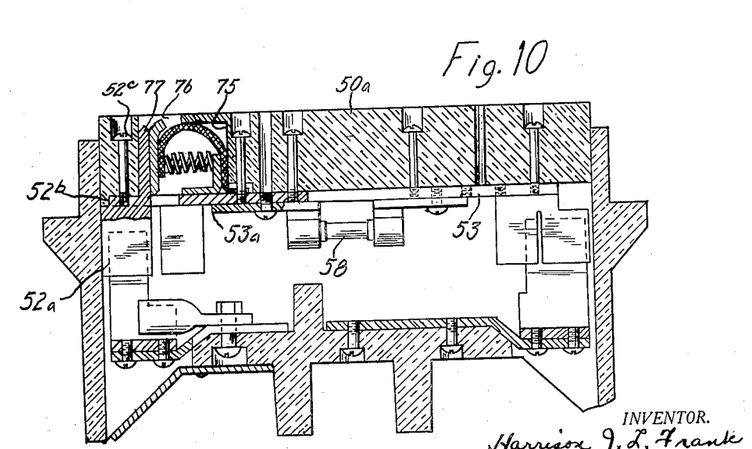
Fig. 10 is a bottom plan section of the testing switch of Fig. 9.

In this form of the device the member 20 may be similar in every respect to the female member of the first form. And, at one of its ends the male member may likewise be similar to male member 50. At its other end however the block 50a is provided with a large cavity 75 opening to the under face of the block and having a small opening 76 to the upper face. The conducting plate 53a to which the fuses are attached at the end containing the cavity 75 does not extend to the end of the block 50a but projects over the cavity for a short distance. The contact fingers 52a adapted to coact with fingers 29 in member 20 are formed on a small plate 52b secured to the block as by screws 52c, which plate has a vertical extension 77 extending up into cavity 75 at one end thereof opposite opening 76.

Figure 11:
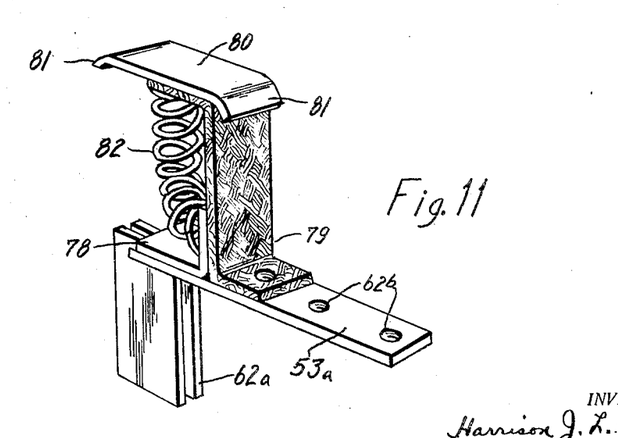
Figs. 11, 12 and 13 are details of a male member equipped for testing.
Figure 12:
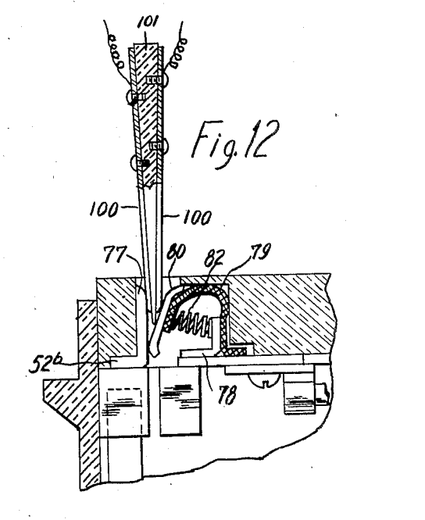
Figure 13:
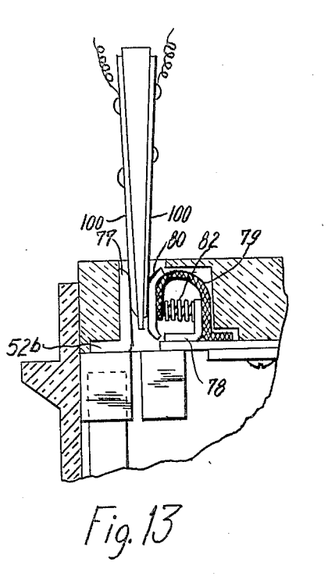

Plate 53a and the parts connected directly therewith are shown more in detail in Figs. 11, 12 and 13. In these figures there are shown the fingers 62a for holding one end of a large fuse and holes 62b for attaching the plate to block 50a and fuse clips to the plate.

To one end of plate 53a is fixed an L-shaped spring abutment 78 and back of this, one end of a flexible lead 79. To the other end of lead 79 is fixed a small plate 80 provided with curved ends 81 as shown. Fixed to the same end of lead 79 as plate 80 is one end of a coil spring 82 whose other end is fixed to the upright portion of the L-shaped abutment 78. Lead 79 and the spring 82 are of such construction as to allow the plate 80 to be pressed firmly against part 77 of plate 52b. The electric connection in this form of male member from fingers 29 in one end of member 20 to fingers 29 in the other end thereof is through lead 79 to plate 53a then through the fuse to plate 53 and its associated parts.

By means of this form of block and the form of bipolar instrument terminal shown in Figs. 9, 12 and 13, an instrument may be inserted in the circuit in series or taken therefrom without breaking any contacts.

This form of terminal consists of two plates 100 of conducting material connected to the two poles of the instrument, and secured on opposite sides of a thin strip of insulating material 101 which may project a short distance beyond the ends of the plates.

When the tip of this device is inserted in opening 76 it easily separates one end of plate 80 from part 77 while the spring 82 holds the other end in contact with 77 until plates 100 have contacted with 77 and 80 respectively, thus maintaining the one circuit until the other is also completed.

The reverse operation occurs upon withdrawal of the terminal, the circuit through the instrument being maintained until the parts 77 and 80 are once more in contact and the main circuit completed.

Both forms of male member are adapted to be used as a switch by placing them in member 20 with the fuse outward to break the circuit or by placing them in with the fuse inside to complete the circuit.

It should be noted that the male member shown in Figs. 1 to 8 is identical in shape and outer dimensions with the form shown in Figs. 9 to 11 and interchangeable therewith so that one may be substituted for the other without change and tests carried out when desired without interruption of service.

Figs. 19 to 29 inclusive illustrate a form of the device somewhat different from that previously described and designed particularly for two or more fuses although only one need be used if desired. This device is of the same unit dimension as the previous form and may be set in place thereof or in combination therewith in making up panels.

Figure 19:
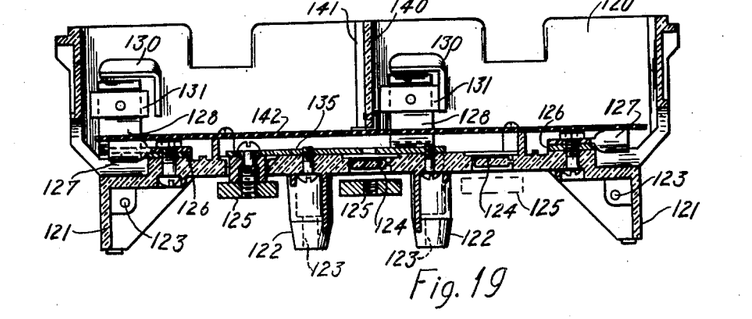
Fig. 19 is a bottom plan section of the female member of a modified form of switch, one that is equipped for reception of two male members and two fuses.
Figure 20:
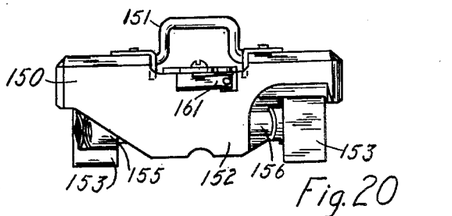
Fig. 20 is a bottom plan view of a male member adapted to cooperate with one half of the female member 19.

In this form of the device the female member 120 formed of suitable insulating material, includes legs 121 and 122, which contain suitable openings 123 therein for the purpose of securing two or more of the devices together and to a suitable supporting base.

The bottom of the member is provided with knock outs 124 providing means through which connection may be made between the elements inside and the bus bars 125 which latter are mounted in any suitable fashion on the supporting base.

Inside of the female member 120 and at its ends suitable terminal connecting plates 126 are mounted and to these are bolted the lead terminals 127. These plates 126 extend laterally to close to one side wall of the member and have secured thereto vertically extending blades 128, lying close to the said wall and under an overhanging portion 130 formed thereon. Each blade 128 may be provided on its outer side with a protecting cover piece 131 of insulating material. These provisions protect the live switch blades against accidental touching when the member is open.

In the central portion the member 120 is provided with a connecting plate 135 overlying the central knockout and one of the others whereby this plate may be connected to either one of two of the three bus bars over which the device is to be placed or to the third bar is the device is reversed.

This plate 135 is provided with two sets of switch blades similar to blades 128 and similarly placed but located one on each side of the cross center line of the member and on the opposite side of the longitudinal center line of the member so that, when the member is divided into two compartments each will have switch blades in diagonally opposite corners.

Figure 26:
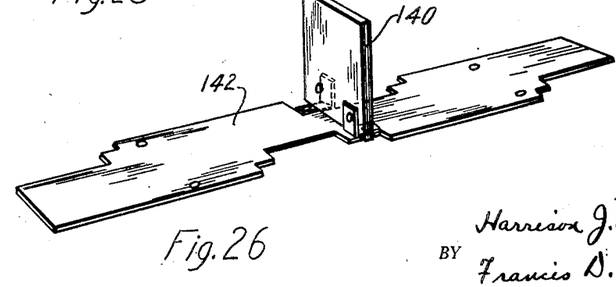
Fig. 26 is a perspective of the back guard plate.
Figure 27:
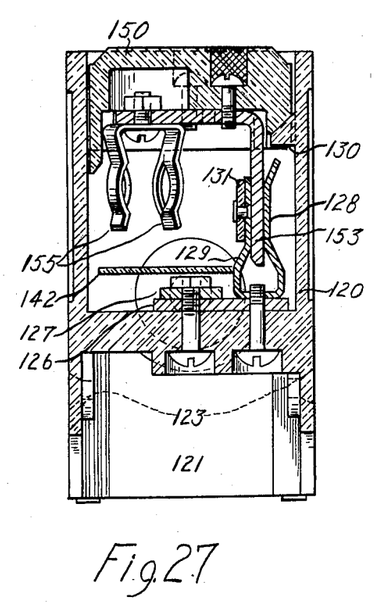
Fig. 27 is a section on the line 27—27 of Fig. 22.

With the plates 126 and 135 in position, the member 120 is divided into two compartments by a removable insulating wall or shield 140 slidable in guides 141 provided for this purpose. The wall 140 preferably carries also a cover piece 142 of insulating material which overlies the plates 126 and 135 so that when this wall unit, which is shown in Fig. 26, is in position, all of the live parts are guarded against accidental touching.

The male member 150 is shown in detail in Figs. 20, 21, 27 and 28 as consisting of a block 150a of insulating material of such size as to fit in the female member and fill one of the compartments between an end wall and the wall 140, a suitable bail 151 being provided to aid in withdrawing the same.

Figure 28:
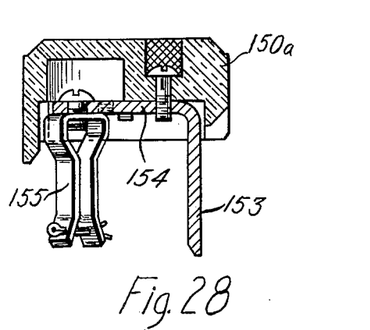
Fig. 28 is a similar section of the male member per se, a different form of fuse holding clip being shown.
Figure 29:
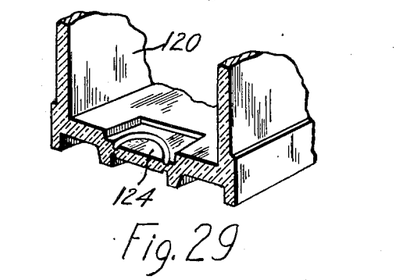
Fig. 29 is a section on line 29—29 of Fig. 24.

The side of the block opposite the bail 151, is provided with depending side walls 152 which aid in piloting the block into proper position for engagement of the contact members carried thereby with the switch blades 128 and 129. These contact members comprise two blade members 153 mounted at diagonally opposite corners of the block each being one branch of an L-shaped plate 154 secured to the block at one end. These plates 154 are provided with suitable tapped openings by means of which fuse holding clips or fingers 155 are bolted thereto. The tapped openings referred to are several in number and so located that several sizes of fuse may be provided for. The form shown in Figs. 20 and 27 for example, is for the round end of a cartridge fuse while that in Fig. 28 is for a cartridge fuse with a blade end.

Figure 21:
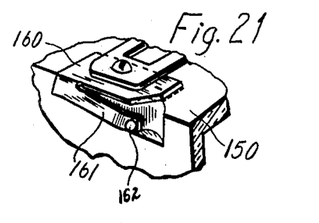
Fig. 21 is a perspective view of a spring latch.
Figure 22:
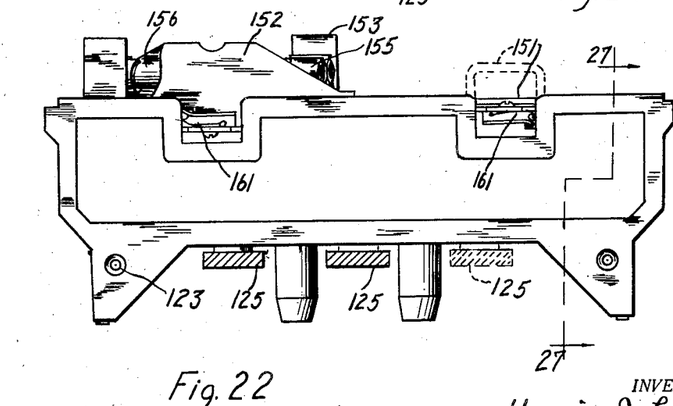
Fig. 22 is a bottom plan view of the modification disclosed in Fig. 19 but showing one of the male members in open switch position.

As it is intended that the male member carrying a fuse 156 may be placed in its compartment in reversed position when it is desired to maintain the circuit broken, means are provided to hold the block 150a securely in such position. This means may consist of a small plate 160 bent over one edge of the block and having the bent over edge cut nearly across so as to provide a tongue 161 having a teat 162 adapted to coact with the side wall of the member 120 when the block is reversed.

It will be observed that the double branch receptacle of Fig. 19 may be converted into a single branch receptacle very easily. Plate 135 and its blades 128 may be removed, together with the structure 140—142 of Fig. 26. One of the lead terminals 127 may be removed and the connecting plate 126 thus left bare may be connected to a bus bar by any suitable means. This converts the double branch receptacle of Fig. 19 into a single branch receptacle, with which may be used a single branch plug, having contacts located and designed to cooperate with the contacts 128 at the ends of the receptacle.

Further, in order to provide means for testing the fuses without removing member 150 openings 165 (Fig. 23) are provided through the block 150 from the outer to the inner face within the area covered by plates 154. These openings permit the insertion of contact wires or rods connected with any suitable indicator (not shown).

Figure 30:
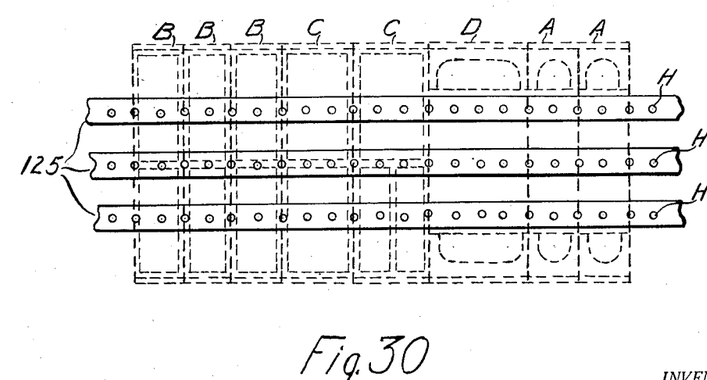
Fig. 30 is a diagrammatic view of a plurality of bus bars and a plurality of different interchangeable forms of the switch blocks of the present invention.

Fig. 30 indicates one feature of the present device and shows how a panel may be made up of the units described herein along with other units adapted to be used therewith. For example, A indicates such a unit as is shown in Figs. 1 to 3; B indicates such a unit as is shown in Figs. 19 to 29; C indicates a similar unit but one and one half times as wide as A and B, the latter two being of the same size; D indicates a unit of twice the width of A or B; all are mounted over the same bus bars E, F and G, and connected thereto as suits each particular purpose. The bus bars are provided with tapped openings H at predetermined intervals throughout their lengths, so that any one or more of the units may be removed and a suitable substitution may be made without disturbing the remainder of the panel and the substituted units will fit properly so as to provide a neat appearance.

In using the present devices it is proposed to group them together as indicated in Figs. 8 and 30 to form panels although single units may of course be used alone. It is further proposed to group the units in some cases with adjacent units having their male members secured together so that they may be removed and replaced as a unit.

In the latter case two or more of the male members will have a plate extending across them and fastened thereto preferably, however, not rigidly, as a certain amount of universal movement is desirable. Such a grouping is indicated in Fig. 8 with the plate designated at 250 being fastened to the male members 50 as by the screws 251. A suitable bail may be provided if desired, the latter not being shown.

Figure 23:
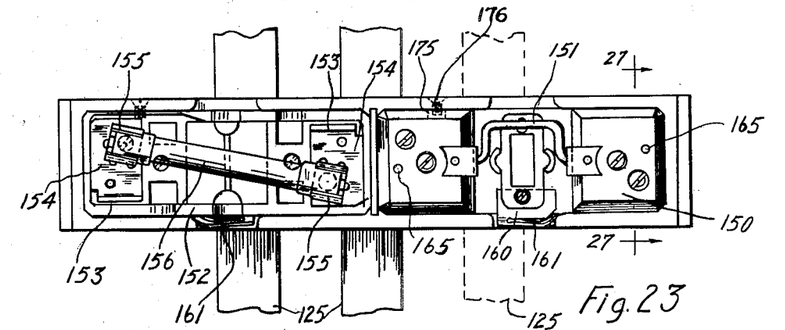
Fig. 23 is a front view of the device of Fig. 22.
Figure 24:
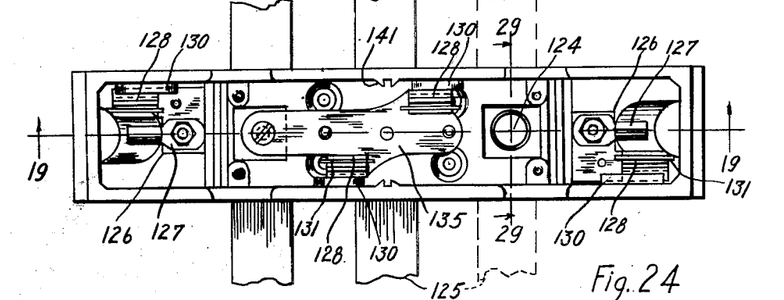
Fig. 24 is a front inside view of the modification of Fig. 19 with the guard plate therein having been removed.
Figure 25:
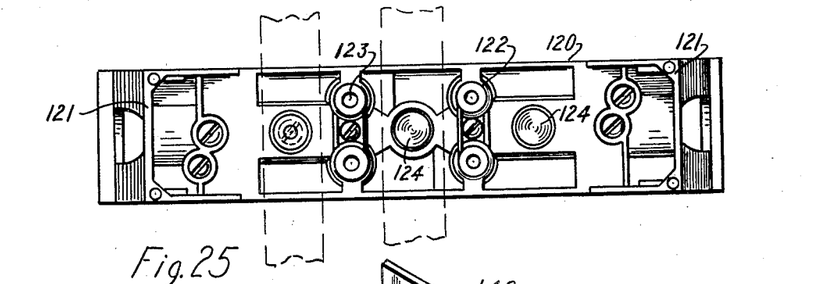
Fig. 25 is a back view of the same.

A further limiting means to prevent exchange of the male members of two or more units is indicated in Fig. 23 in which the male member is shown as provided with a slot 175 cooperating with a screw 176 projecting through one of the side walls. It is of course obvious that other male members, not so slotted, could not be inserted when the screw is in position. Other forms of projections and slots may of course be used to accomplish a like purpose.

This case is in part a continuation of application Ser. No. 175,173, filed March 14, 1927, on Electric fusing devices, and is a division of application Ser. No. 353,343, filed April 8, 1929, Fused switching devices.

Now, having described the invention and the preferred form of embodiment thereof, it is to be understood that the said invention is to be limited, not to the specific details herein described and illustrated, but only by the scope of the claims which follow.

I claim:

1. In combination, a plurality of female switch members of identical construction, and a plurality of male switch members of identical construction, any one of said male switch members being adapted to fit any one of said female switch members, each of said male members containing a removable and adjustable means which can be readily adjusted to prevent the male member from fitting any of said female members except a predetermined one.

2. In combination, a plurality of female switch members, and a plurality of male switch members, any one of said male switch members being adapted to fit any one of said female switch members, each of said male members containing a means which can be adjusted to prevent the male member from fitting any of said female members except a predetermined one, said means including a pair of adjustable fuse clips, and a stop.

3. A switch member formed of insulation and having contacts on one side thereof and having a reinforcing metal plate on the opposite side thereof, said member being cut away under the edges of said plate whereby the latter may form a handle means for said switch member.

4. In a receptacle, a plurality of electrically conducting parts, a plurality of switch contacts connected thereto, and a removable insulating plate in said receptacle covering all of said parts, said contacts projecting above and through said plate so as to be exposed.

5. In combination, switch blocks of identical construction and having spaced contacts thereon, plugs of identical construction and adapted to mate with said blocks and having spaced contacts thereon, adapted to mate with said block contacts, fuses in said plugs connected said plug contacts, and removable and adjustable means in each of said blocks preventing the insertion therein of a plug carrying a higher amperage and/or a lower voltage fuse than the one for which the block is intended.

6. An elongated molded receptacle of insulating material, containing a contact in each of its ends, two contacts disposed centrally therein and connected to each other by a plate, means passing thru the floor of said receptacle for connecting said plate to a bus bar, and means for connecting either of the end contacts to the terminal of a cable passing thru a receptacle end or to a bus bar, the central contacts and the plate connecting means being removable to permit the receptacle being converted to a single branch use, where one end contact is connected to a cable and the other to a bus bar, from a double branch use, where both end contacts are connected to cables and the center contacts are connected to a bus bar.

7. A switching unit of the base and head type including a cup shaped base on whose bottom are a plurality of live parts, bus bars separated from said live parts by the bottom of the base, contacts at the ends of the base projecting from the bottom towards the open top thereof, and an insulating sheet overlying said parts and concealing all of them but leaving the contacts exposed.

8. An elongated switching unit adapted to be mounted over a plurality of parallel bus bars and having holes in the ends thereof and holes in the bottom thereof near the ends and over the bus bars, conducting parts on the bottom near the ends thereof, and connectors passing thru said bottom holes for connecting either conducting part to a bus bar or to the terminal of a cable entering the unit thru the end holes.

9. An elongated switching unit adapted to be mounted over three equally spaced parallel bus bars, and having symmetrical ends, a conducting part over an end one of said bus bars and a second conducting part over the other two of said bus bars, the unit being 180° reversible so that the first named conducting part may connect to either end bus bar.

10. In a switching unit, a cup shaped base having end contacts, a bottom plate therefor of insulating material concealing live parts of the unit, and adjustable means on said plate between said contacts for preventing the plugging-in into said base, a head carrying a fuse whose amperage rating is more or whose voltage rating is less than that which the base ought to receive.

11. In combination, a plurality of units having mating end contacts and comprising female switch members, and male switch members any one of which male members is adapted to fit any one of said female switch members, each unit containing a means between and independent of the end contacts for preventing the union, with a female member, of a male member of a lesser capacity than that which the female member ought to receive.

12. In combination, a receptacle, a plug adapted to be associated therewith in "on" and "off" positions, and resilient means on one part engageable with a portion of the other part for maintaining the plug in association with the receptacle, in either position.

13. A cup shaped receptacle for use over bus bars and having legs between and isolating said bus bars, said legs being hollow to provide bores for mounting screws whose heads are accessible from the interior and front of said receptacle.

14. An elongated unit for use over bus bars and having end shelves projecting therefrom at the ends to combine with the shelves of similar and adjacent units to form a housing frame.

15. A cup shaped base for use over bus bars and having a rib projecting upwardly from the bottom thereof to form a barrier across said base, and an insulating bottom plate overlying said bottom and engaging said barrier to co-operate therewith to form compartments in said base, live parts of one polarity, in one of said compartments thus being shielded from live parts of another polarity, in the other of said compartments.

16. A cup shaped base having a unitary structure comprising a bottom covering plate and a barrier plate fixed thereto, the barrier plate being perpendicular to the bottom covering plate.

17. A cup shaped base having a unitary structure comprising a bottom covering plate and a barrier plate fixed thereto, the barrier plate being perpendicular to and secured to the bottom covering plate.

18. A cup shaped elongated base and two plugs therefor, said plugs closing and sealing that part of the base in which it is disposed, the two plugs being disposed end to end and filling substantially the entire base.

19. An elongated cup shaped receptacle containing a contact in each end, and two central adjacent contacts, plugs filling substantially the entire receptacle and disposed end to end, each plug having contacts mating with an end contact and the nearest central contact and having an insulating block covering one-half of the receptacle, either plug, when in position, rendering the contacts therebeneath inaccessible from contact.

20. A switching unit comprising a receptacle having similar ends and symmetrically disposed mounting means and mounted over three equally spaced bus bars, a conducting part therein overlying an end bus bar and the center one, a second conducting part overlying the other end bus bar, the unit being 180° reversible over the bus bars so that the conducting parts will overlie either end bus bar, as desired.

21. A unit adapted to be mounted over a plurality of bus bars, barriers projecting from the bottom of the unit to form isclated channels under said bottom for the reception of said bus bars, said barriers extending uninterruptedly from side to side of the unit so as to co-operate with barriers of similar units placed in contiguous side-by-side relation, to form continuous long channels for said bus bars.

HARRISON J. L. FRANK.